US005865371A

United States Patent [19]

Pace et al.

[11] Patent Number: 5,865,371

[45] Date of Patent: Feb. 2, 1999

[54] ARMATURE MOTION CONTROL METHOD AND APPARATUS FOR A FUEL INJECTOR

[75] Inventors: Jeffrey B. Pace, Newport News; Vernon R. Warner, Wicomico; James A. Nitkiewicz, Newport News, all of Va.

[73] Assignee: Siemens Automotive Corporation, Auburn Hills, Mich.

[21] Appl. No.: 686,936

[22] Filed: Jul. 26, 1996

[51] Int. Cl.[6] .......... F16K 31/08

[52] U.S. Cl. .......... 239/5; 239/585.1; 239/585.4

[58] Field of Search .......... 239/5, 585.1–585.5; 251/129.21

[56] References Cited

U.S. PATENT DOCUMENTS

| | | | |
|---|---|---|---|
| 4,218,021 | 8/1980 | Palma . | |
| 4,726,389 | 2/1988 | Minoura et al. | 239/585.4 X |
| 4,757,973 | 7/1988 | Rizk et al. . | |
| 4,813,647 | 3/1989 | Yagi et al. . | |
| 5,009,389 | 4/1991 | Kawamura . | |
| 5,033,716 | 7/1991 | Mesenich . | |
| 5,044,563 | 9/1991 | Mesenich . | |
| 5,139,224 | 8/1992 | Bright . | |
| 5,143,301 | 9/1992 | Reiter et al. . | |
| 5,197,675 | 3/1993 | Daly . | |
| 5,203,538 | 4/1993 | Matsunaga et al. . | |
| 5,269,280 | 12/1993 | Braun et al. . | |
| 5,271,565 | 12/1993 | Cerny . | |
| 5,287,829 | 2/1994 | Rose . | |
| 5,299,776 | 4/1994 | Brinn, Jr. et al. . | |
| 5,312,050 | 5/1994 | Schumann et al. . | |
| 5,328,100 | 7/1994 | Bergstrom et al. . | |
| 5,396,926 | 3/1995 | Pataki et al. . | |
| 5,462,231 | 10/1995 | Hall | 239/585.4 |
| 5,479,901 | 1/1996 | Gibson et al. . | |

FOREIGN PATENT DOCUMENTS

| | | | |
|---|---|---|---|
| 2140626 | 11/1984 | United Kingdom | 239/585.4 |

*Primary Examiner*—Lesley D. Morris
*Attorney, Agent, or Firm*—Russel C. Wells

[57] ABSTRACT

An injector needle/armature assembly stroke is controlled so as to minimize opening and closing impact forces. The controlled motion eliminates or significantly reduces the problems associated with valve bounce, providing less acoustic emission, reduced wear, improved spray characteristics and better flow regulation. The current applied to the electromagnetic coil of the injector in accordance with a modified injector timing pulse waveform serves to reduce impact velocities at each end of the armature stroke. The waveform can be optimized for a class of injectors with a pulse width modulated waveform, repeatedly re-energizing and de-energizing the electromagnetic coil in accordance with an optimized on/off pulse train.

16 Claims, 4 Drawing Sheets

ARMATURE MOTION CONTROL METHOD AND APPARATUS FOR A FUEL INJECTOR

BACKGROUND OF THE INVENTION

The present invention relates to fuel injectors and, in particular, to a method and apparatus for controlling an injector needle stroke to minimize opening and closing impact forces.

An electromagnetic fuel injector utilizes a solenoid assembly to supply an actuating force to a fuel metering valve. Typically, a plunger style armature supporting a fuel injector needle reciprocates between a closed position, where the needle is closed to prevent fuel from escaping through the discharge orifice, and a fully open position, where fuel is discharged through the discharge orifice.

When the solenoid is energized, the solenoid armature, and thus the injector needle, is magnetically drawn from the closed position toward the fully open position by a solenoid generated magnetic flux. Typically, the solenoid is energized until the armature reaches its fully opened position and a period of time thereafter to discharge a desired amount of fuel. As the armature reaches the top of its stroke, it impacts an armature stop generating impact noise and resulting in the armature bouncing against the armature stop. This bouncing has detrimental effects on flow characteristics of the fuel.

When an appropriate amount of fuel has been discharged from the injector, the solenoid is de-energized, and the armature and injector needle are urged toward the closed position by the force of a spring. Similar to the top of the armature stroke, when the armature reaches the bottom of its stroke and the injector needle is seated to close the discharge orifice, the velocity of the injector needle generates impact noise against the seat and is subject to significant bouncing. The occurrence of such bouncing will typically result in an extra amount of unscheduled fuel being injected from the fuel injector into the engine, and this extra fuel can have an adverse effect on fuel economy and engine exhaust constituents.

Various means for eliminating such bouncing have been proposed, including those found in commonly assigned U.S. Pat. Nos. 4,878,650, 5,033,716 and 5,139,224.

SUMMARY OF THE INVENTION

The present invention provides a method and apparatus to change the motion of an injector needle/armature assembly so as to minimize opening and closing impact forces. Minimizing these forces provides less acoustic emission, reduced wear, improved spray characteristics and better flow regulation.

In accordance with the invention, the electromagnetic coil is selectively energized and de-energized to control fully open position impact velocity and closed position impact velocity of the injector needle. In a preferred arrangement, the electromagnetic coil is energized at least twice between the closed position and the fully open position and at least once between the fully open position and the closed position. In this regard, when controlling the injector needle from its closed position toward its fully open position, the electromagnetic coil is energized for a first predetermined period of time, which is selected so as to coast the injector needle to the fully open position. In a similar manner, during the downstroke of the injector needle, the electromagnetic coil is re-energized for a second predetermined period of time, which is selected so as to slow the injector needle prior to reaching the closed position. An optimized opening/closing pulse train can be generated by repeatedly re-energizing and de-energizing the electromagnetic coil during both the opening stroke and the closing stroke of the injector needle.

In accordance with another aspect of the invention, there is provided a method of controlling a reciprocating injector needle in a fuel injector. The injector needle is reciprocated between a closed position and a fully open position by energization of the electromagnetic coil and is biased toward the closed position by a biasing member. The method includes the steps of (a) energizing the electromagnetic coil for a first predetermined period of time, the first predetermined period of time being selected so as to partially deflect the injector needle from the closed position toward the fully open position such that momentum of the injector needle will carry the injector needle to the fully open position after the electromagnetic coil is de-energized, and (b) prior to the injector needle reaching the fully open position, re-energizing the electromagnetic coil for a second predetermined period of time, the second predetermined period of time being selected so as to slow the injector needle prior to reaching the fully open position and discharge an appropriate amount of fuel. The method may further include the steps of (c) de-energizing the electromagnetic coil such that the injector needle is urged toward the closed position by the biasing member, and (d) prior to the injector needle reaching the closed position, re-energizing the electromagnetic coil for third predetermined period of time, the third predetermined period of time being selected so as to slow the injector needle prior to reaching the closed position.

Step (b) may be practiced by re-energizing the electromagnetic coil immediately before the injector needle reaches the fully open position. Step (d) may be practiced by re-energizing the electromagnetic coil immediately before the injector needle reaches the closed position. An optimized on/off pulse train may be provided for both the opening stroke and the closing stroke by repeatedly re-energizing and de-energizing the electromagnetic coil.

In another aspect of the invention, there is provided a fuel injector for an internal combustion engine. The fuel injector includes an electromagnetic coil, an injector needle reciprocable between a closed position and a fully open position by the energization and de-energization of the electromagnetic coil, and a driver circuit operatively coupled with the electromagnetic coil. The driver circuit is configured to selectively energize and de-energize the electromagnetic coil to control fully open position impact velocity and closed position impact velocity of the injector needle. In a preferred arrangement, the driver circuit is an electronic control unit (ECU).

BRIEF DESCRIPTION OF THE DRAWINGS

These and other aspects and advantages of the present invention will be apparent from the following detailed description of preferred embodiments when read in conjunction with the accompanying drawings, in which.

DETAILED DESCRIPTION OF PREFERRED EMBODIMENTS

Figure 1:
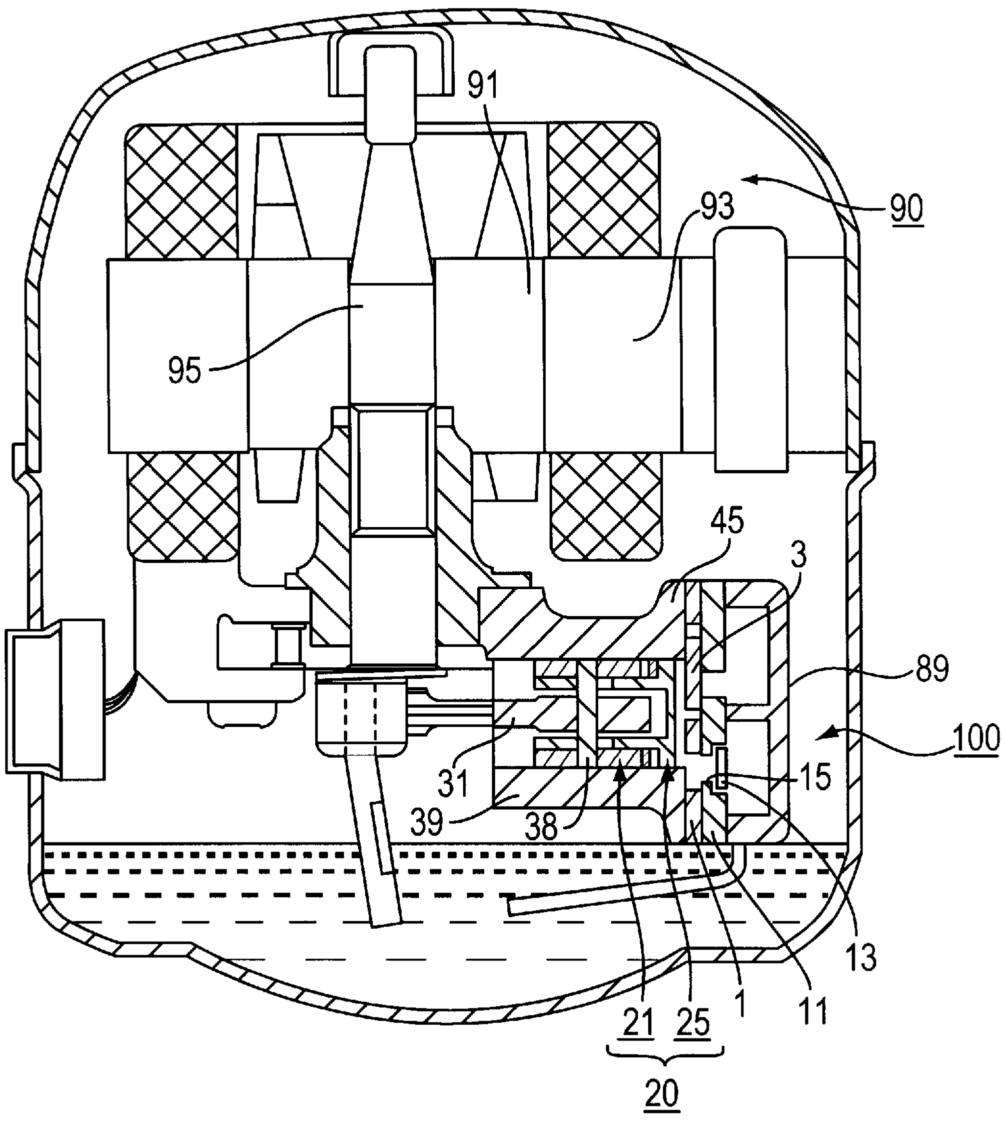
FIG. 1 is a cross-sectional view of an electromagnetic fuel injector.

A cross-sectional illustration of an exemplary fuel injector is illustrated in FIG. 1. The injector includes a reciprocating armature assembly 12 supporting an injector needle 14. The injector needle 14, in a closed position, is shaped to engage a needle seat 16 adjacent a discharge orifice 18. When engaged with the needle seat 16, fuel is prevented from being discharged from the orifice 18.

The armature assembly 12, and thus the injector needle 14, is reciprocal in the injector between a closed position (as shown in FIG. 1) and a fully open position. A spring 20 engages the armature assembly 12 and urges the assembly 12 toward the closed position. An electromagnetic coil 22 produces a magnetic field to draw the armature assembly 12, and the injector needle 14, against the force of the spring 20 to the injector needle fully open position. A driver circuit 24 of an ECU, applies current to the electromagnetic coil 22 in accordance with an injector timing pulse waveform.

The present invention provides an improvement in the conventional injector timing pulse waveform that minimizes opening and closing impact forces of the armature assembly 12 and injector needle 14.

Figure 2:
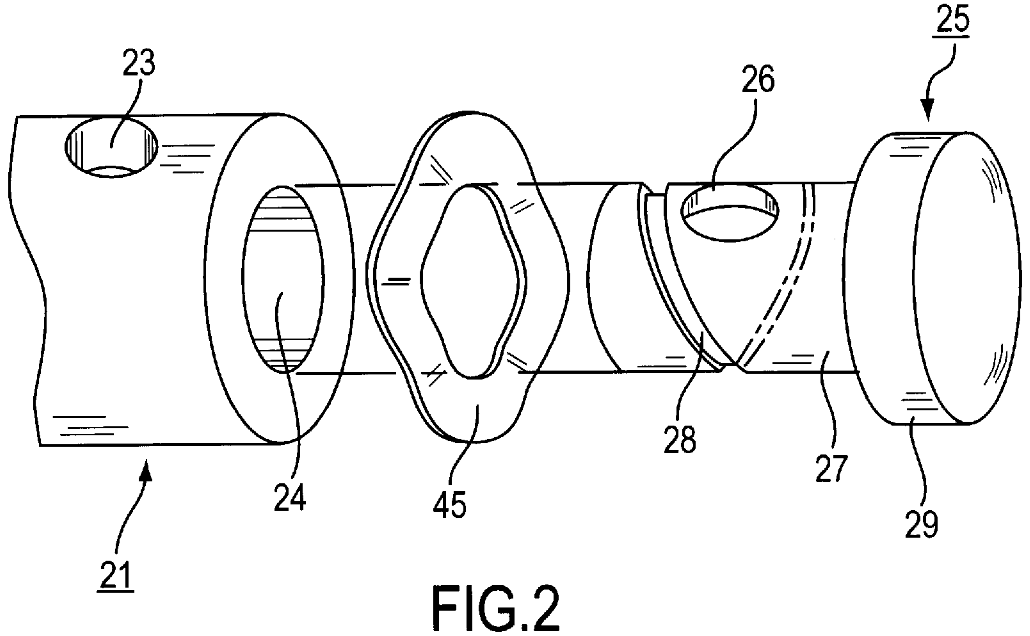
FIG. 2 is a graph illustrating a comparison between the injector timing pulse waveform according to the present invention and a typical injector timing pulse waveform.

FIG. 2 illustrates a typical injector timing pulse waveform compared with the timing pulse waveform according to the invention. Referring to FIG. 2, with the conventional injector timing pulse waveform, the electromagnetic coil 22 is energized at a time TS when it is desired to inject fuel into the intake manifold of the internal combustion engine. By virtue of the current applied to the electromagnetic coil 22, the armature assembly 12 is magnetically drawn by the electromagnetic coil 22 toward the fully open position. As indicated above, with the conventional waveform, the armature impacts an armature stop at an impact velocity that results in valve bounce. After a predetermined period of time $T_p$ elapses in accordance with various fuel injector parameters, the electromagnetic coil 22 is de-energized at a time TF, and the injector needle 14 is driven toward its closed position by the force of the spring 20. The impact velocity of the injector needle 14 in the needle seat 16 is such that the injector needle 14 bounces, releasing an extra amount of unscheduled fuel into the engine.

With continued reference to FIG. 2, in accordance with the present invention, it has been observed for a CNG (compressed natural gas) injector with 375 mm lift tested with nitrogen at 100 psi that the injector needle 14 possesses sufficient upward momentum just after leaving the needle seat 16 to complete its upward travel. Thus, referring to FIG. 2, at a time T1 the electromagnetic coil 22 is de-energized, and the armature assembly 12 coasts to its fully open position by virtue of its momentum gained from the initial pulse at time T1. At time T2, prior to the armature assembly reaching its fully open position, the electromagnetic coil 22 is re-energized to maintain the injector needle 14 at its fully open position until a predetermined amount of fuel is discharged from the discharge orifice 18. Because the current to the electromagnetic coil 22 is turned off substantially immediately after time TS, the impact velocity of the armature assembly 12 as it reaches its fully open position is significantly reduced. As a result, at time T2 when the electromagnetic coil 22 is re-energized, problems associated with valve bounce can be essentially eliminated.

After the predetermined amount of fuel is discharged from the injector, current to the electromagnetic coil 22 is turned off at a time T3. As noted, the injector needle 14 and armature assembly 12 are then urged toward their closed position by the spring 20. During this stroke, prior to the injector needle 14 reaching the needle seat 16, the electromagnetic coil 22 is re-energized at a time T4 for a predetermined period of time. At a time TF, the current to the electromagnetic coil 22 is turned off, and the armature assembly and injector needle 14 reach the closed position. The current pulse between times T4 and TF serves to slow the closing velocity of the armature assembly 12, thereby significantly reducing the impact velocity of the injector needle 14 and the needle seat 16. As a result, valve bounce is substantially eliminated.

Figure 3:
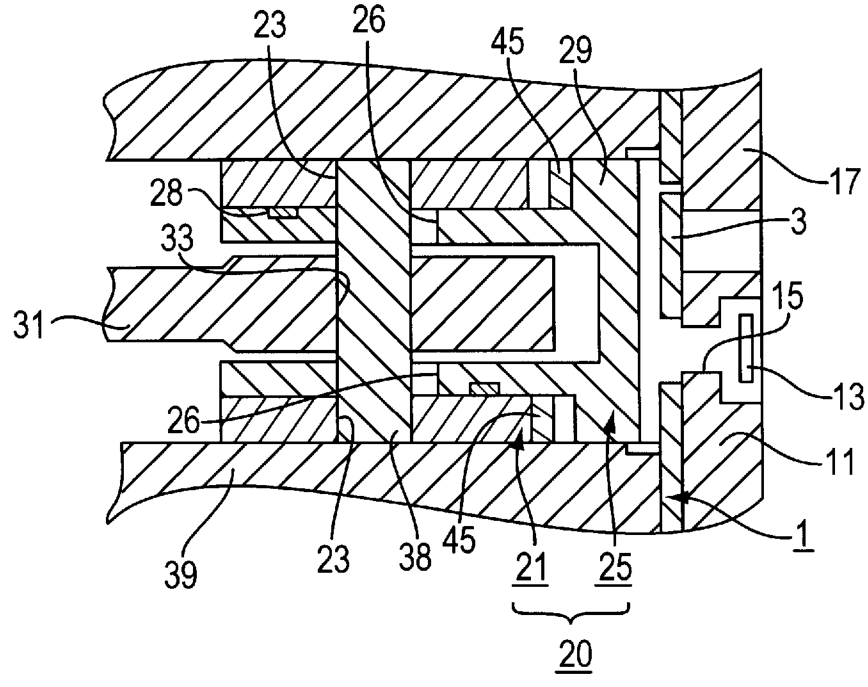
FIG. 3 is a graph illustrating a comparison between the needle motion profile according to the conventional waveform illustrated in FIG. 2 and the needle motion profile according to the improved waveform of the present invention.
Figure 4:
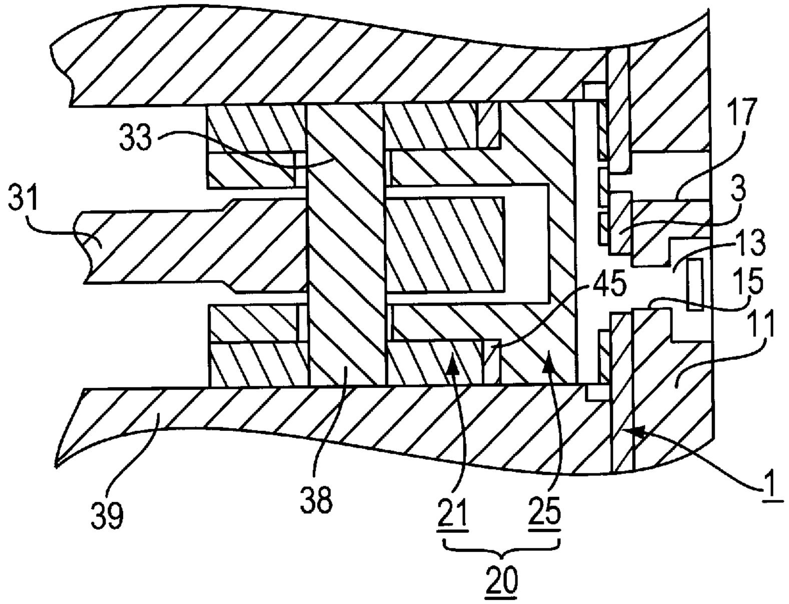
FIG. 4 is a graph illustrating the impact energy of the conventional waveform shown in FIG. 2.
Figure 5:
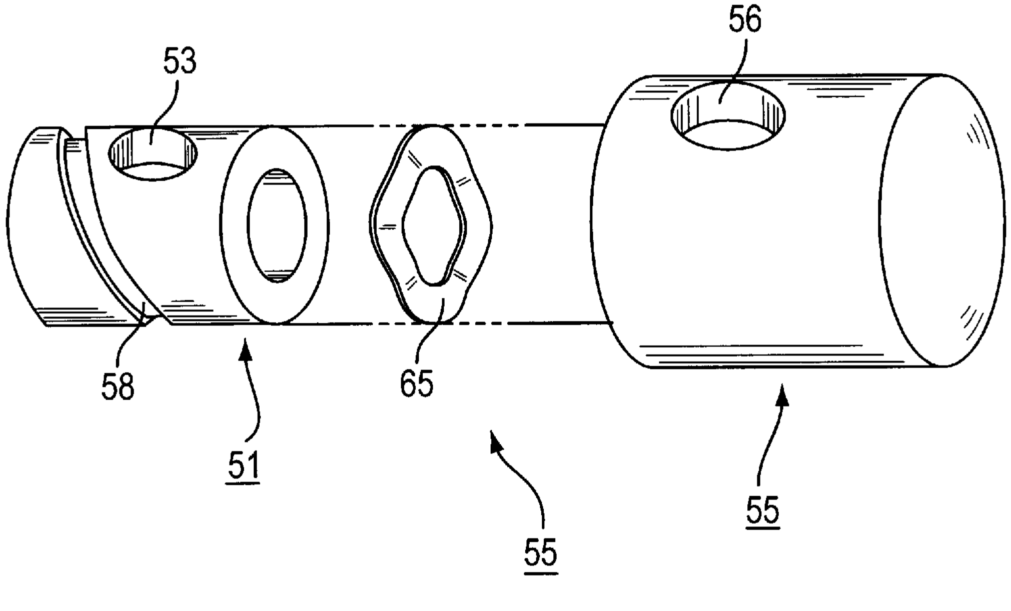
FIG. 5 is a graph illustrating impact energy of the injector with the waveform according to the present invention.

FIG. 3 illustrates a comparison of the conventional armature motion profile and the armature motion profile achieved as a result of the method according to the present invention. As is clear from FIG. 3, the timing pulse waveform according to the present invention provides a dramatic reduction in needle bounce at both ends of the armature stroke, which results in improved spray quality and flow linearity. Moreover, referring to FIGS. 4 and 5, the effect of reducing needle impact energy for a single pulse is shown. FIG. 4 illustrates the impact energy distribution for the conventional injector timing pulse waveform, and FIG. 5 illustrates the reduced needle impact energy distribution with the injector timing pulse waveform according to the present invention. The significant reduction in needle impact energy further illustrates the dramatic effect of the timing pulse waveform according to the present invention.

Changing the manner in which the injector is energized has an effect on opening and closing times, as shown in FIG. 3. Ideally, for an optimized waveform (described below), the impact energies could be lowered by such an amount that opening or closing impact would not register on an accelerometer trace. The effect of the modified armature motion on flow, however, is minimum. Measurements on a DEKA® IV, in Stoddard at 45 psi yielded the following waveform versus flow rate information, for an original drive pulse of 2.5/20/3,000:

| Waveform | Weight [g/S] |
|---|---|
| Original | 21.36 |
| Modified | 21.08 |

The result is that the small flow reduction on opening can be balanced by the small flow increase on closing. The change in flow rate from 21.36 to 21.08 is small, but the impact energy is lowered to less than one-third of its original value. The acoustic difference in these two waveforms is dramatic.

Figure 6:
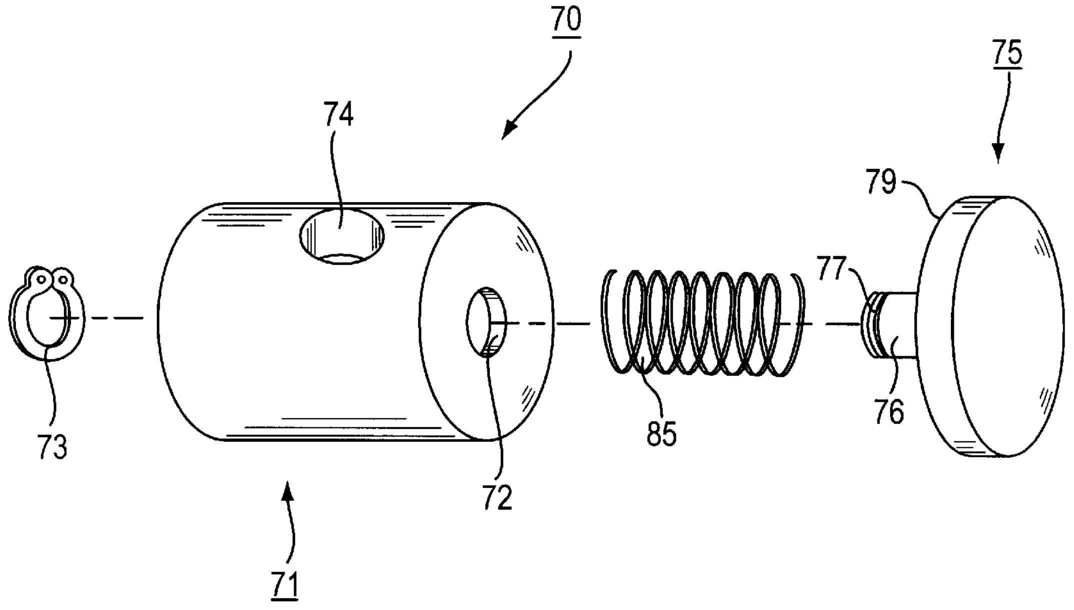
FIG. 6 illustrates an optimized injector timing pulse waveform according to the invention.
Figure 1:
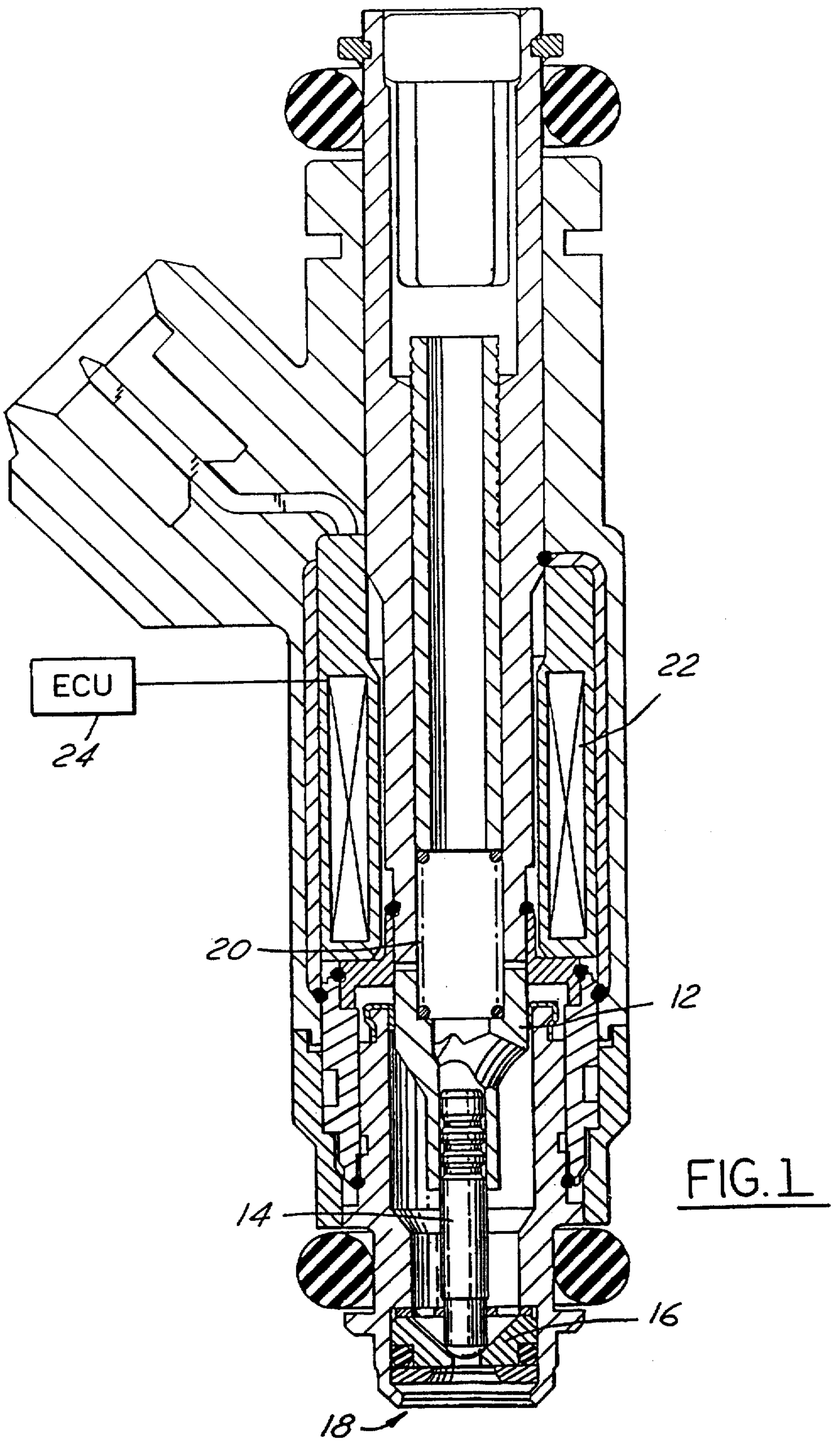
Figure 2:
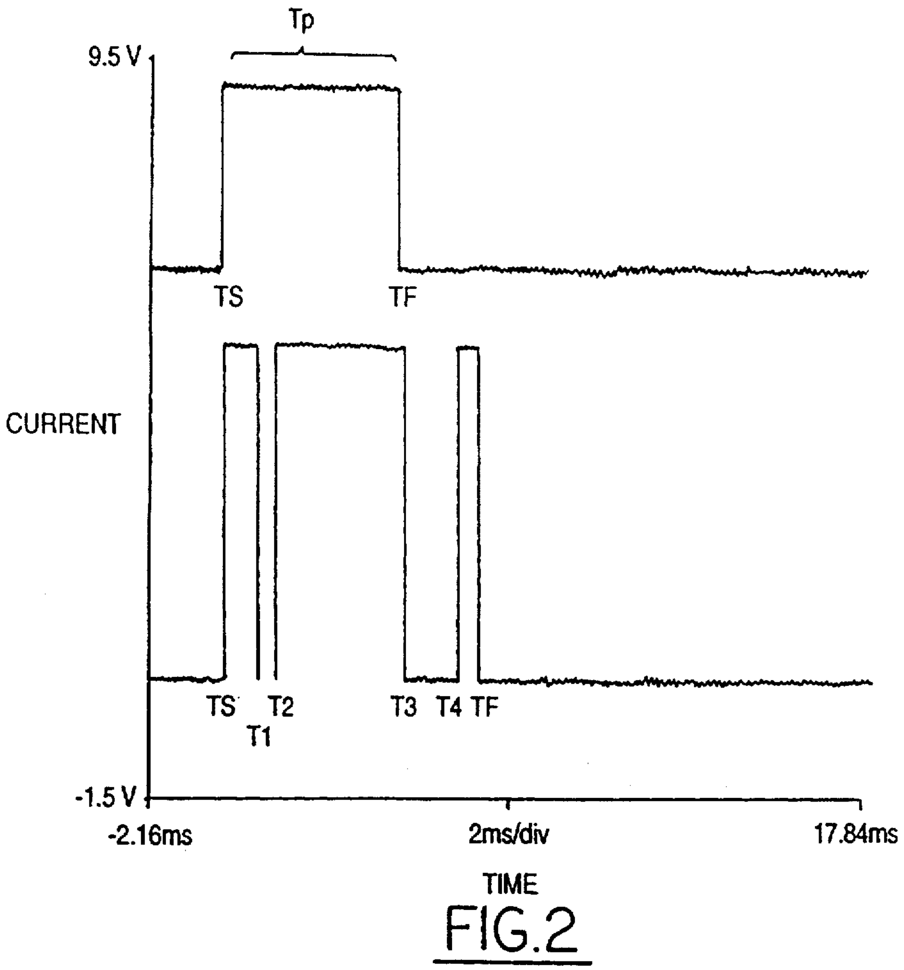
Figure 3:
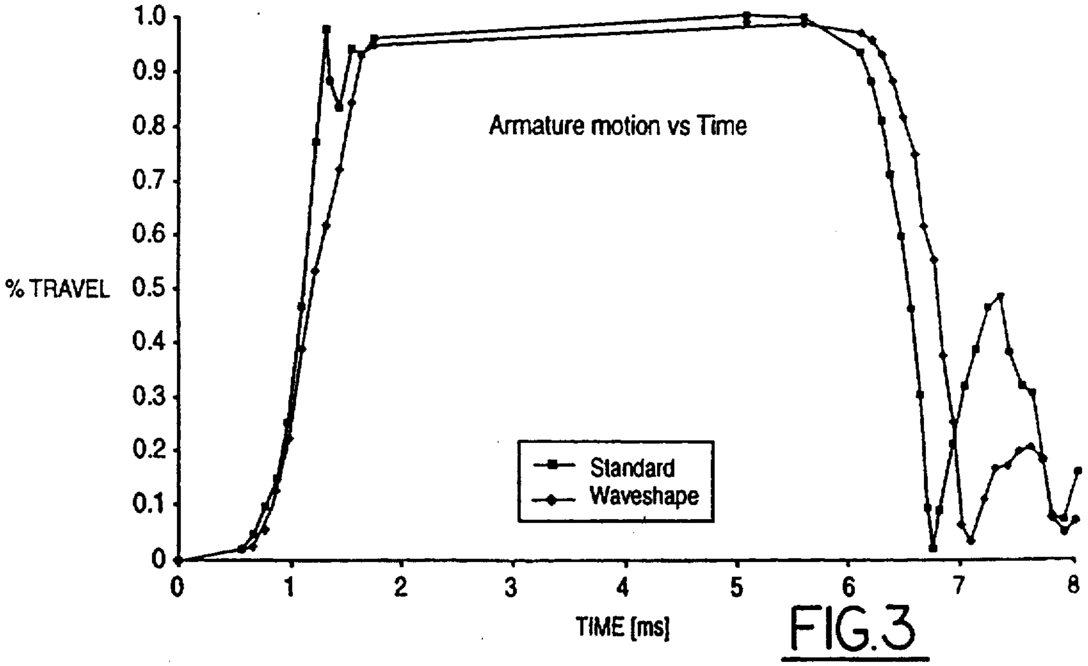
Figure 4:
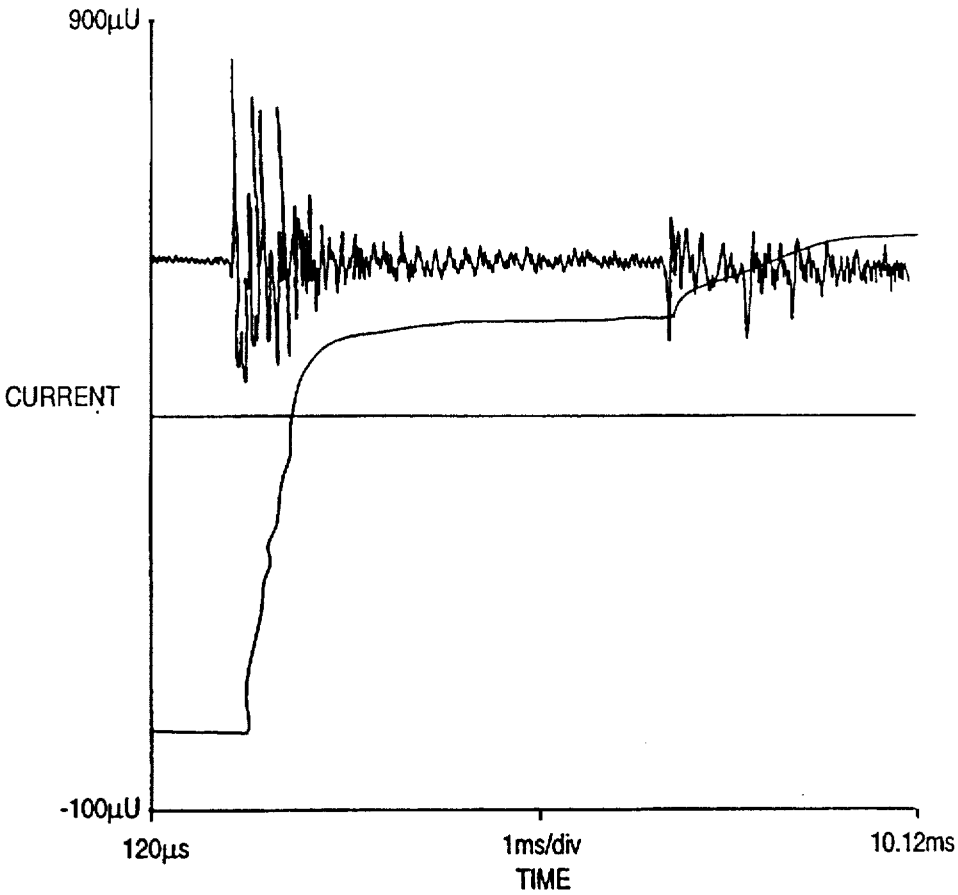
Figure 5:
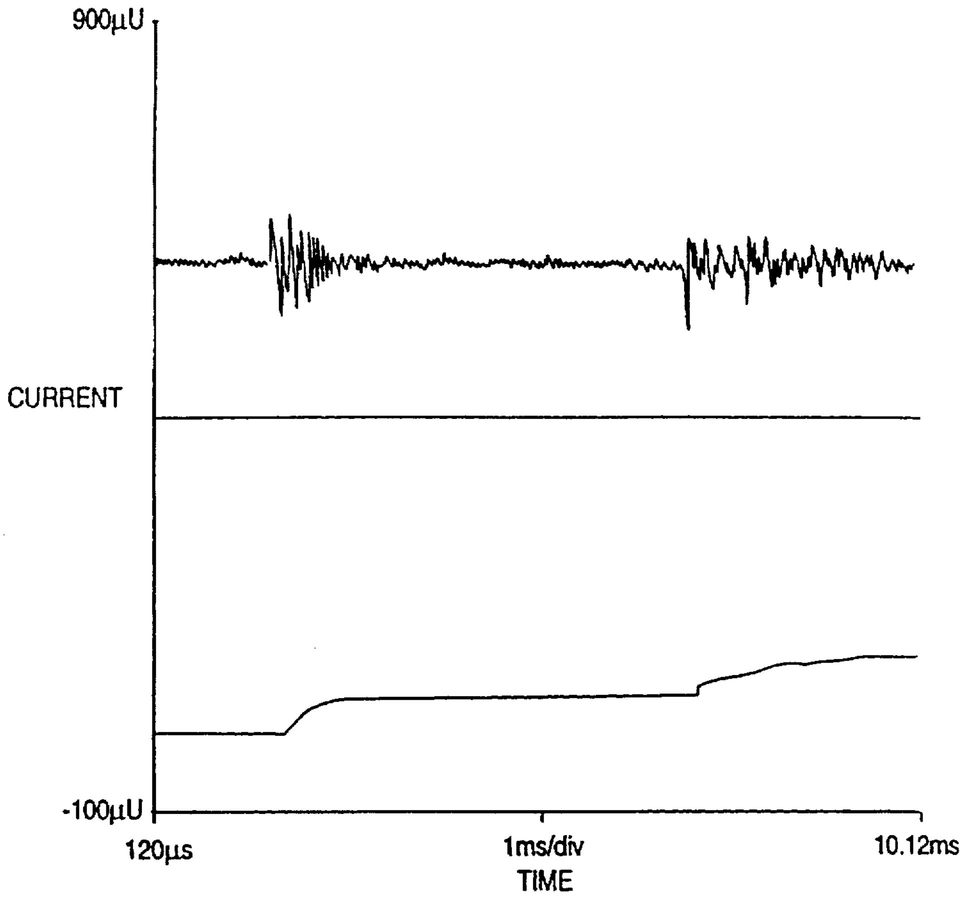
Figure 6:
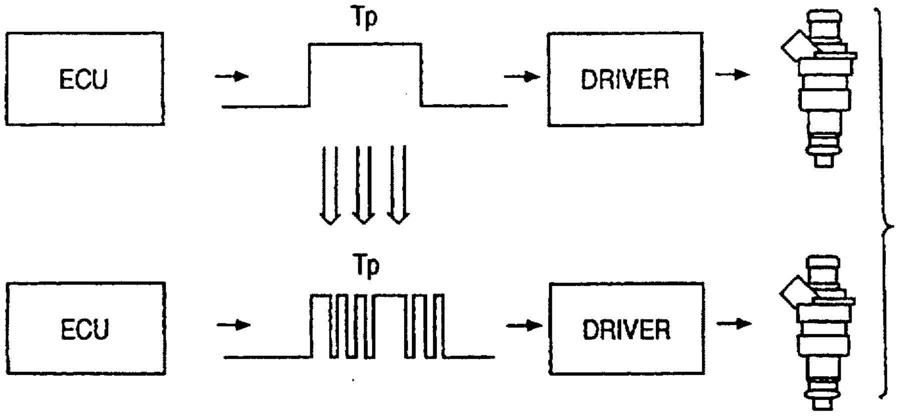

The pulse waveform illustrated in FIG. 2 can be optimized by rapidly switching on and off the current to the electromagnetic coil, thereby providing an adjustable magnetic force on the injector needle 14. FIG. 6 illustrates an example of an optimized opening/closing pulse train that can be substituted for the rising and falling edge of the conventional timing pulse in the driver circuit. This pulse width modulated waveform can be optimized for a class of injectors on a class-by-class basis.

The improved injector timing pulse waveform according to the present invention substantially eliminates valve bounce at each end of the valve stroke. In addition, needle impact energies are reduced. The advantages achieved by the present invention include reduced noise and wear as well as improved spray quality and flow linearity.

While the invention has been described in connection with what is presently considered to be the most practical and preferred embodiments, it is to be understood that the invention is not meant to be limited to the disclosed embodiments, but on the contrary, is intended to cover various modifications and equivalent arrangements included within the spirit and scope of the appended claims.

What is claimed is:

1. A method of controlling a reciprocating injector needle in a fuel injector, the injector needle reciprocating between a closed position and a fully open position by energization of an electromagnetic coil and being biased toward the closed position by a biasing member, the method comprising:

(a) energizing the electromagnetic coil for a first predetermined period of time, the first predetermined period of time being selected so as to partially deflect the injector needle from the closed position toward the fully open position such that momentum of the injector needle imparted by the energizing of the electromagnetic coil over the first predetermined period of time will carry the injector needle to the fully open position after the electromagnetic coil is de-energized; and (b) prior to the injector needle reaching the fully open position, re-energizing the electromagnetic coil for a second predetermined period of time, the second predetermined period of time being selected so as to discharge an appropriate amount of fuel from the fuel injector.

2. A method as claimed in claim 1, further comprising after step (b):

(c) de-energizing the electromagnetic coil after the second predetermined period of time such that the injector needle is urged toward the closed position by the biasing member; and (d) prior to the injector needle reaching the closed position, re-energizing the electromagnetic coil for a fourth predetermined period of time, the fourth predetermined period of time being selected so as to slow the injector needle prior to reaching the closed position.

3. A method as claimed in claim 1, wherein step (b) is practiced by de-energizing the electromagnetic coil immediately before the injector needle reaches the fully open position.

4. A method as claimed in claim 3, wherein step (d) is practiced by re-energizing the electromagnetic coil immediately before the injector needle reaches the closed position.

5. A method as claimed in claim 2, wherein step (d) is practiced by repeatedly re-energizing and de-energizing the electromagnetic coil in accordance with an optimized on/off pulse train.

6. A method as claimed in claim 1, wherein step (b) is practiced by repeatedly re-energizing and de-energizing the electromagnetic coil in accordance with an optimized on/off pulse train.

7. A method of controlling a reciprocating valve, the valve reciprocating between a closed position and a fully open position by energization of an electromagnetic coil and being biased toward the closed position by a biasing member, the method comprising (a) selectively energizing and de-energizing the electromagnetic coil to control fully open position impact velocity and closed position impact velocity of the injector needle, wherein the selective energizing is practiced by energizing the electromagnetic coil for a first predetermined period of time, the first predetermined period of time being selected to enable the injector needle to coast to the fully open position.

8. A method as claimed in claim 7, wherein step (a) is practiced by (b) energizing the electromagnetic coil at least twice between the closed position and the fully open position; and (c) energizing the electromagnetic coil at least once between the fully open position and the closed position.

9. A method as claimed in claim 8, wherein step (b) is practiced by repeatedly re-energizing and de-energizing the electromagnetic coil in accordance with an optimized on/off pulse train.

10. A method as claimed in claim 8, wherein step (c) is practiced by repeatedly re-energizing and de-energizing the electromagnetic coil in accordance with an optimized on/off pulse train.

11. A method as claimed in claim 7, wherein the selective energizing is further practiced by re-energizing the electromagnetic coil for a second predetermined period of time, the second predetermined period of time being selected so as to slow the injector needle prior to reaching the closed position.

12. A fuel injector for an internal combustion engine, comprising:

an electromagnetic coil;

an injector needle reciprocable between a closed position and a fully open position by the energization and de-energization of said electromagnetic coil; and a driver circuit operatively coupled with said electromagnetic coil, said driver circuit selectively energizing and de-energizing the electromagnetic coil to control fully open position impact velocity and closed position impact velocity of said injector needle, said driver circuit controlling the fully open position impact velocity by energizing the electromagnetic coil for a first predetermined period of time, the first predetermined period of time being selected to enable the injector needle to coast to the fully open position.

13. A fuel injector as claimed in claim 12, wherein said driver circuit comprises means for energizing the electromagnetic coil at least twice between the closed position and the fully open position and for energizing the electromagnetic coil at least once between the fully open position and the closed position.

14. A fuel injector as claimed in claim 13, wherein said energizing means comprises means for re-energizing the electromagnetic coil for a second predetermined period of time, the second predetermined period of time being selected so as to slow the injector needle prior to reaching the closed position.

15. A fuel injector as claimed in claim 13, wherein said energizing means comprises means for repeatedly re-energizing and de-energizing the electromagnetic coil in accordance with an optimized on/off pulse train.

16. A fuel injector as claimed in claim 12, wherein said driver circuit is part of an ECU.

* * * * *

UNITED STATES PATENT AND TRADEMARK OFFICE
CERTIFICATE OF CORRECTION

PATENT NO. : 5,865,371

DATED : February 2, 1999

INVENTOR(S) : Pace et al.

It is certified that error appears in the above-identified patent and that said Letters Patent is hereby corrected as shown below:

The title page, showing the illustrative figure, should be deleted and substituted therefor, the attached title page.

Delete Figs. 1-6, and substitute therefor, Figs 1-6, as shown on the attached page Signed and Sealed this Fourteenth Day of December, 1999

Attest:

Q. TODD DICKINSON

Attesting Officer

*Acting Commissioner of Patents and Trademarks*

United States Patent [19]
Pace et al.

[11] Patent Number: 5,865,371
[45] Date of Patent: Feb. 2, 1999

[54] ARMATURE MOTION CONTROL METHOD AND APPARATUS FOR A FUEL INJECTOR

[75] Inventors: Jeffrey B. Pace, Newport News; Vernon R. Warner, Wicomico; James A. Nitkiewicz, Newport News, all of Va.

[73] Assignee: Siemens Automotive Corporation, Auburn Hills, Mich.

[21] Appl. No.: 686,936

[22] Filed: Jul. 26, 1996

[51] Int. Cl.$^{6}$ .................... F16K 31/08
[52] U.S. Cl. .................... 239/5; 239/585.1; 239/585.4
[58] Field of Search .................... 239/5, 585.1-585.5; 251/129.21

[56] References Cited

U.S. PATENT DOCUMENTS

| | | | |
|---|---|---|---|
| 4,218,021 | 8/1980 | Palma . | |
| 4,726,389 | 2/1988 | Minoura et al. | 239/585.4 X |
| 4,757,973 | 7/1988 | Rizk et al. . | |
| 4,813,647 | 3/1989 | Yagi et al. . | |
| 5,009,389 | 4/1991 | Kawamura . | |
| 5,033,716 | 7/1991 | Mesenich . | |
| 5,044,563 | 9/1991 | Mesenich . | |
| 5,139,224 | 8/1992 | Bright . | |
| 5,143,301 | 9/1992 | Reiter et al. . | |
| 5,197,675 | 3/1993 | Daly . | |
| 5,203,538 | 4/1993 | Matsunaga et al. . | |
| 5,269,280 | 12/1993 | Braun et al. . | |
| 5,271,565 | 12/1993 | Cerny . | |
| 5,287,829 | 2/1994 | Rose . | |
| 5,299,776 | 4/1994 | Brinn, Jr. et al. . | |
| 5,312,050 | 5/1994 | Schumann et al. . | |
| 5,328,100 | 7/1994 | Bergstrom et al. . | |
| 5,396,926 | 3/1995 | Pataki et al. . | |
| 5,462,231 | 10/1995 | Hall | 239/585.4 |
| 5,479,901 | 1/1996 | Gibson et al. . | |

FOREIGN PATENT DOCUMENTS

| | | | |
|---|---|---|---|
| 2140626 | 11/1984 | United Kingdom | 239/585.4 |

*Primary Examiner*—Lesley D. Morris
*Attorney, Agent, or Firm*—Russel C. Wells

[57] ABSTRACT

An injector needle/armature assembly stroke is controlled so as to minimize opening and closing impact forces. The controlled motion eliminates or significantly reduces the problems associated with valve bounce, providing less acoustic emission, reduced wear, improved spray characteristics and better flow regulation. The current applied to the electromagnetic coil of the injector in accordance with a modified injector timing pulse waveform serves to reduce impact velocities at each end of the armature stroke. The waveform can be optimized for a class of injectors with a pulse width modulated waveform, repeatedly re-energizing and de-energizing the electromagnetic coil in accordance with an optimized on/off pulse train.

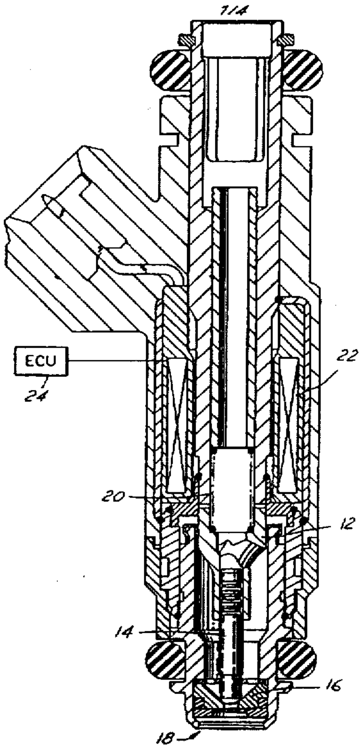

16 Claims, 4 Drawing Sheets